Dec. 21, 1926.
A. C. PEEL
1,611,774
INSECTICIDE APPLYING APPARATUS
Filed May 24, 1924   3 Sheets-Sheet 1
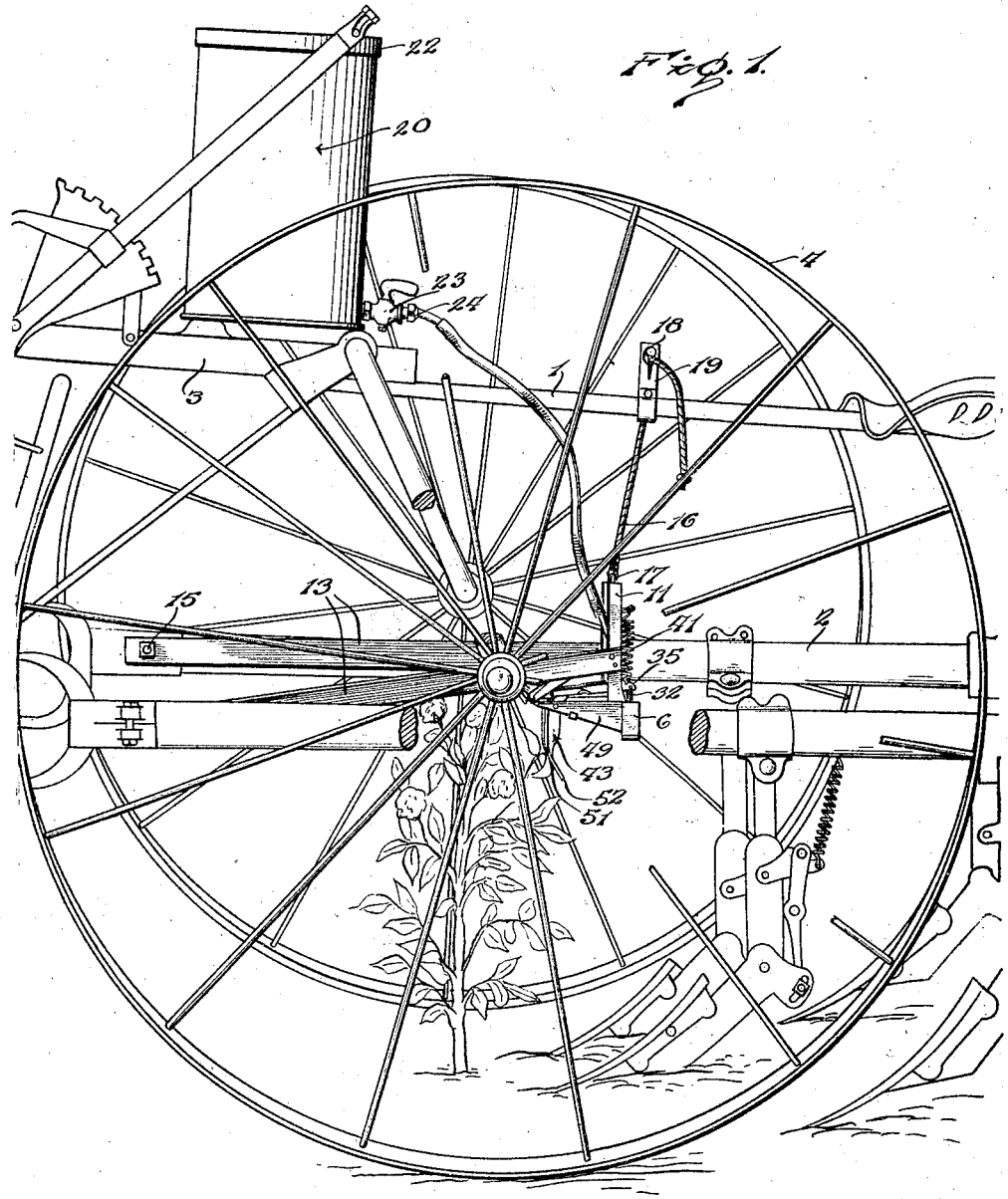
Inventor
A. C. Peel
By Lacey & Lacey, Attorneys

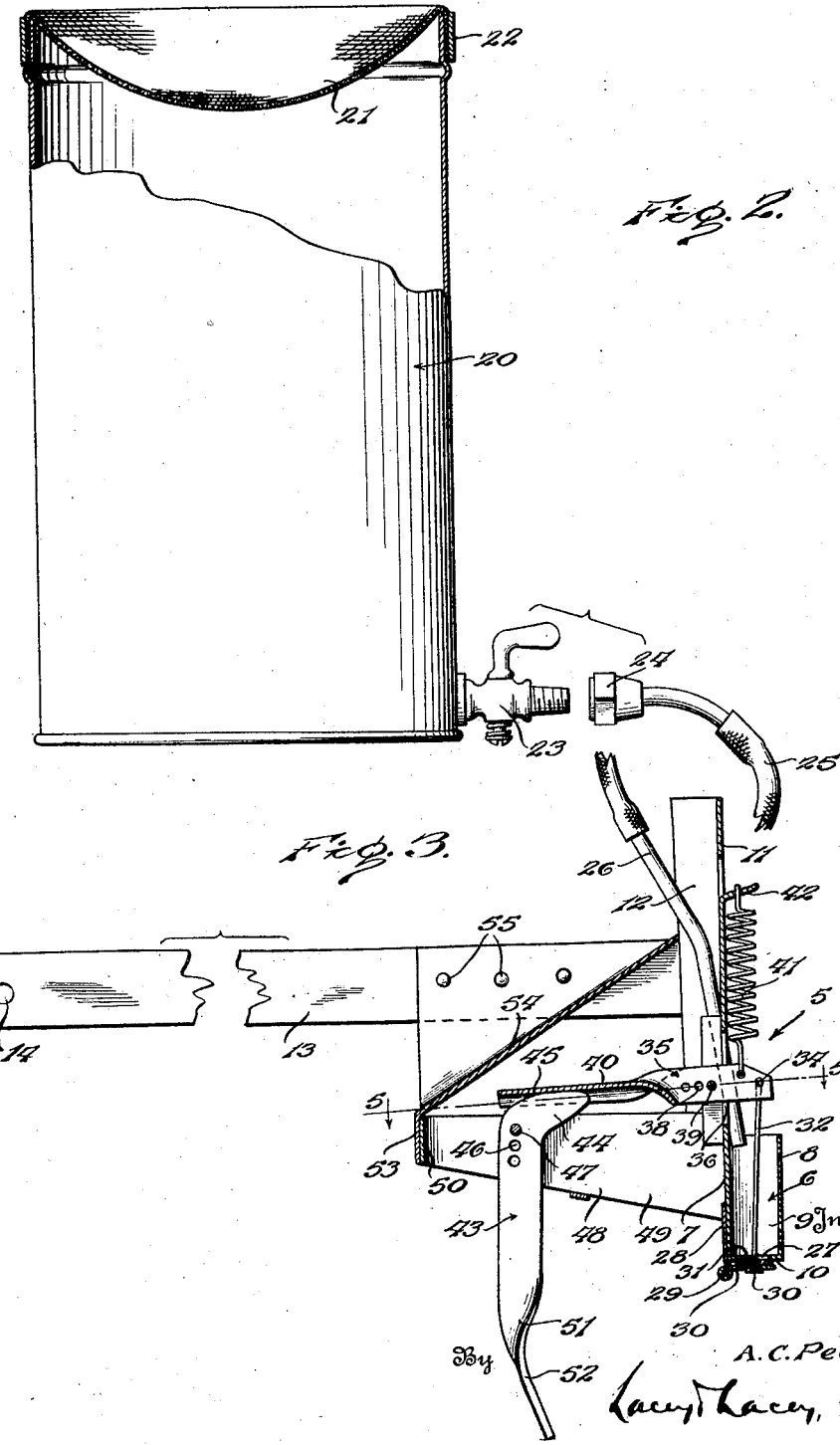

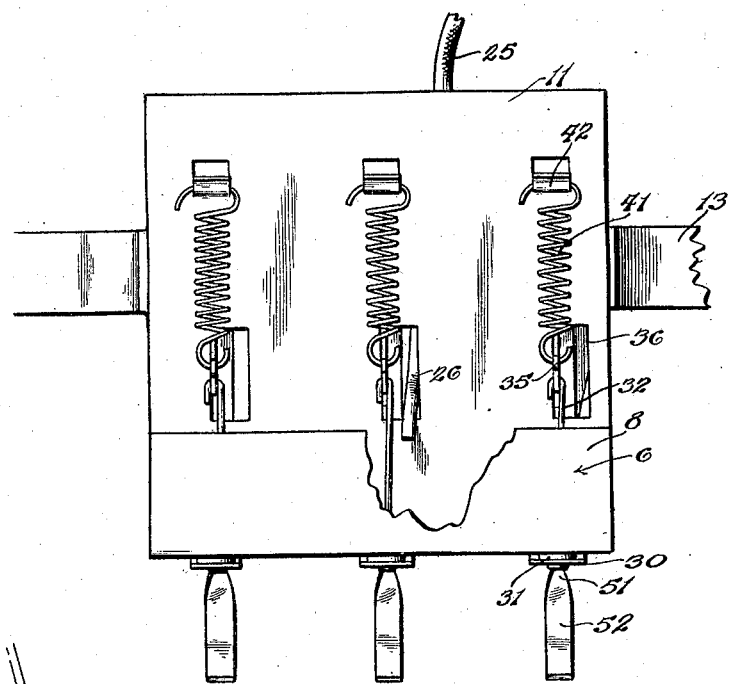
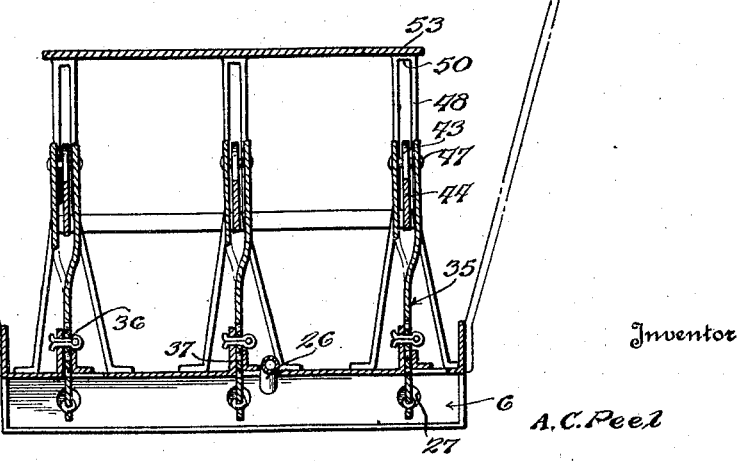

Patented Dec. 21, 1926.

1,611,774

UNITED STATES PATENT OFFICE.

ALEXANDER C. PEEL, OF GROSVENOR, TEXAS, ASSIGNOR OF ONE-HALF TO LEONARD MILLER, OF BROWNWOOD, TEXAS.

INSECTICIDE-APPLYING APPARATUS.

Application filed May 24, 1924. Serial No. 715,634.

This invention relates to an apparatus for applying insecticide to plants. The ordinary types of apparatuses for this purpose embody means for spraying the insecticide onto the growing plants, but in such promiscuous application of the insecticide, the same is usually discharged directly onto the upper sides of the leaves of the plants and is either soon dried by the sun or washed off by the rain, thereby destroying its efficiency. Therefore, it is the primary object of the present invention to provide an apparatus for applying insecticide to plants, which apparatus will embody novel means operating in such a manner as to effect application of the insecticide directly against the under sides of the leaves of the plants so that after application, the insecticide will be protected from the sun's rays, and will likewise be protected from being washed off by rain fall. Therefore, the invention contemplates so applying the insecticide as to avoid waste thereof and prolong its period of effectiveness.

Another object of the present invention is to provide, in an apparatus for the purpose stated, means engageable by the leaves of the plants as the apparatus is moved along the row thereof, which means will offer sufficient resistance to effect overturning of the leaves of the plants so that their under sides will be presented upwardly, the means being operatively connected with a means provided for controlling the delivery of the insecticide, so that the insecticide is delivered only at the moment the leaf is overturned.

Another object of the invention is to provide a novel arrangement of distributing means whereby the insecticide may be applied to a number of individual leaves of the row of plants, either simultaneously or otherwise, as the applying means passes along the row, so that a thorough distribution of the insecticide will be effected.

Another object of the invention is to provide an apparatus so constructed that it may be placed upon the market as a unit and may be conveniently mounted, by the purchaser, upon a cultivator, wheeled plow, and various other agricultural machines designed to travel along and straddle a row of plants in the ordinary functioning of the machine, so that such machine may be made use of as supporting means for the apparatus and without any alteration of its structure.

In the accompanying drawings:

Figure 1 is a perspective view of the apparatus mounted upon a wheeled cultivator;

Figure 2 is a side elevation, partly in section, illustrating the reservoir for the insecticide;

Figure 3 is a vertical front to rear sectional view through the distributing mechanism of the apparatus;

Figure 4 is a rear elevation of the distributing apparatus;

Figure 5 is a horizontal sectional view taken substantially on the line 5—5 of Figure 3 looking in the direction indicated by the arrows.

In Figure 1 of the drawings, the apparatus embodying the invention is illustrated as installed upon the frame structure of a wheeled cultivator but, inasmuch as it may be installed upon various agricultural machines which, after such installation, serve as a supporting means for the apparatus and not their usual purpose, the construction of the cultivator need not be specifically described except to state that the seat beam thereof is indicated by the numeral 1, the shovel beam by the numeral 2, the draft beam by the numeral 3, and the supporting wheels by the numeral 4.

The apparatus includes a distributing mechanism which is most clearly illustrated in Figures 3, 4, and 5 of the drawings and which is indicated in general by the numeral 5, and this apparatus includes a distributing tank which is indicated by the numeral 6 and is preferably of oblong rectangular form, the front wall of the tank being indicated by the numeral 7, the rear wall by the numeral 8, the end walls by the numeral 9, and the bottom by the numeral 10, the tank being open at its top. The front wall 7 of the tank 6 is provided with an upward extension indicated by the numeral 11 and provided at its opposite vertical edges with forwardly projecting flanges 12 to which are secured the rear ends of arms 13 each provided at its forward end with an opening 14 through which a bolt 15 may be secured for the purpose of pivotally connecting the respective arm with a respective one of the shovel beams 2. In order that the distributing mechanism may be supported at the proper elevation as determined by the average height of the plants to be treated, a cable, rope, or other flexible element 16 is connected at one end, as at 17, to the extension 11 of the front wall 7 and is led upwardly and through a tapering slot 18 formed in a detent plate 19 which is clamped upon the beam 1, as clearly shown in Figure 1 of the drawings. By engaging the element 16 in the wider end of the slot 18, the element may be adjusted so as to permit of lowering of the distributing mechanism or an elevation thereof, and when the desired adjustment has been made, the element 16 may be forced down in the lower or narrower end of the slot and thus frictionally held so as to maintain the distributing mechanism at the proper elevation.

The reservoir in which the liquid insecticide is contained, is indicated in general by the numeral 20 and the same is preferably of cylindrical form and open at its top except that a strainer of foraminous material, indicated by the numeral 21, is applied over the said open top of the reservoir, and a retaining hoop or ring 22 is fitted over the margin of the strainer and over the upper end of the wall of the reservoir so as to support the strainer in place. The purpose of the strainer is to exclude all foreign matter such as leaves, twigs, insects, and the like, from the interior of the reservoir and at the same time permit of convenient filling of the reservoir. A draw-off valve 23 is mounted at the bottom of the reservoir at the rear side thereof, the reservoir being fixedly supported, in any suitable manner upon the draft beam 3, and connected to this draw-off valve, by means of a connecting nut 24, is a pipe 25 which is preferably flexible and which is led to and fitted over the upper end of a tube 26 which is mounted through the extension 11 of the wall 7 of the tank 6, the lower end of the tube being positioned to discharge the insecticide into the tank. Means which will now be described, is provided for controlling the discharge of insecticide from the tank 6.

The means referred to comprises, generally speaking, a plurality of valves which are arranged in a series transversely of the distributing mechanism, and means providing for automatic actuation of the valves to effect delivery of the insecticide as the leaves of the plants are encountered by elements of the last mentioned means. The bottom wall 10 of the tank is formed with a series of openings 27 equal in number to the number of valves, and secured to the forward side of the wall 7 of the tank immediately in advance of each opening 27 is a plate 28 to the lower end of which is hingedly connected, as at 29, a valve plate 30 upon the upper face of which is secured a disc 31 of packing material, the disc being of a diameter greater than the diameter of the respective opening 27 and being arranged to completely close the opening by seating against the under side of the bottom 10 of the tank, when the valve plate 30 is in an elevated position as clearly shown in Figure 3 of the drawings. A stem 32 is fitted through the valve disc 31 at the center thereof and through an opening in the valve plate 30 and is provided with a head 33 which engages the under side of the valve plate. The upper end of the stem is connected, as at 34, pivotally, to the rear end of a rocker indicated by the numeral 35. Immediately above the open top of the tank 6, the extension 11 of the front wall 7 of the tank is struck out at intervals to provide slots 36 and outstanding flanges 37. One end portion of the rocker 35 is formed with a series of openings indicated by the numeral 38. A pivot pin 39 is engaged through one or another of the openings 38 and through the respective flange 37, the said end of the rocker extending through the slot 36 and the rocker being thus pivotally mounted beside the flange. Each rocker, at a point forwardly of its pivot, is provided with a substantially horizontally disposed transversely arched portion 40. A spring 41 is connected at its lower end to the rear end of each rocker and at its upper end to a lug 42 struck out from the extension 11, and these springs serve to normally hold the rear ends of the rockers in an upward direction and consequently, through the pull exerted upon the respective stems 33, hold the valve 31 in closed position. It will be evident at this point that upward swinging movement of the forward end of any one of the rockers 35 will result in a downward swinging movement of the rear end of the respective rocker thus exerting a downward thrust upon the respective stem 32 and opening the respective valve 31 to permit of discharge of a small quantity of the insecticide through the respective valve openings 27. Such operation of the parts is effected automatically by a means which will now be described.

The means just referred to and associated with each of the rockers 35, comprises a trip arm indicated in general by the numeral 43. This arm 43 is formed at its upper end with a rearwardly projecting finger 44 the upper edge of which is preferably of cam formation, as indicated by the numeral 45. The finger is formed near its upper end with a vertically extending series of openings 46, and a pivot pin 47 is engageable interchangeably in the openings and likewise is engaged through openings in the spaced side members 48 of a bracket 49 secured to the front wall 7 of the tank 6, the side members of each bracket being connected at their forward ends by a connecting portion 50. The cam edge 45 of the finger 44 of each trip arm 43 engages against the concave under side of the portion 40 of the respective rocker 35, the trip arm depending substantially vertically from its pivot and being freely movable about its pivot. The trip arms are preferably of sheet metal and each arm, at a point suitably spaced above its lower end, is twisted as at 51 and the lower end portion of the arm, or in other words that portion below the twist, is so formed as to extend downwardly and rearwardly at an angle and constitutes a leaf engaging and overturning wiper indicated by the numeral 52.

The connecting portions 50 of the brackets 49 are secured to the rear side of a flange 53 which depends from the forward edge of a plate 54 which is inclined upwardly and rearwardly from the said forward ends of the brackets 49 and has its ends secured, as at 55, to the inner sides of the respective supporting arms 13. This plate 54 constitutes a shield which will prevent the plants becoming entangled in the distributing mechanism and will therefore prevent the leaves and flowers or bolls of the cotton plant being torn off or injured as the apparatus moves along the row.

In operation, the apparatus, supported upon a farm machine suitable for the purpose, is drawn along the rows of cotton plants, the valve 23 having been previously opened to permit of a sufficient quantity of the insecticide to flow from the reservoir 20 into the tank 6 to substantially half fill the tank, and the said valve 23 being then adjusted to suitably reduce the volume of flow from the reservoir. As the apparatus progresses along the row of plants, the wipers 52 of the trip arms 43 will engage the leaves of the plant and as each leaf is engaged, it is overturned, or, in other words, brought to such position that its under side will be presented upwardly, the wipers engaging the leaves near their stems and wiping over the under sides of said leaves toward their apices. Due to the resistance encountered by the wiper 52 in engaging the leaf, the trip arm 43 will be swung about its pivot 47 thereby swinging the finger 44 in an upward direction and causing the cam upper edge 45 thereof to ride longitudinally beneath the portion 40 of the rocker 35 so as to elevate this end of the rocker and depress the opposite end thereof and open the respective valve 31. Therefore, substantially at the time the leaf is overturned by the wiper, a quantity of insecticide will be delivered through the respective opening 27, and as the wiper passes the apex of the leaf over which it has swept, the valve plate 30 and its associated parts will wipe along the leaf thus depositing the insecticide thereon. In this manner the insecticide is delivered in regulated quantities to the under sides of the leaves of the plants as the apparatus is carried along the row of plants, and, because of the direct application of the insecticide to the under sides of the leaves, the insecticide will not be exposed to the rays of the sun when the leaf reassumes its normal position, and likewise there will be no likelihood of the insecticide being washed off in the event of rain fall. It will be understood, of course, that any desired number of the valves and actuating means therefor may be embodied in the apparatus depending upon the conditions under which the apparatus is to be used.

By providing a plurality of openings 38, the fulcrum for the rocker 35 may be varied so as to vary the angular movement of the rear end of the rocker and consequently the distance to which the respective valve is moved toward open position, so that in this manner the amount of insecticide discharged at each opening of the valve may be determined with regard to the character of the insecticide. This result may likewise be effected, but to a more marked degree, by engaging the pivot pin 47 in one or another of the openings 46 so as to vary the angular movement of the forward end of the rocker 35. Thus, by effecting one or another or both of the adjustments referred to, the opening of the respective valve may be predetermined with considerable accuracy.

Having thus described the invention, what is claimed as new is:

1. In apparatus for supplying insecticide to plants, a container having an outlet, a valve for the outlet, a rocker for actuating the valve, means normally holding the valve closed and the rocker in predetermined position, and a trip arm positioned to be operated by the plants and having its upper end of cam formation and extended beneath said rocker to move it and effect an opening of the valve.

2. In apparatus for supplying insecticide to plants, a container for the insecticide having an outlet, a valve for the outlet, a rocker for actuating the valve adjustably mounted, means normally holding the valve closed and the rocker in predetermined position, and a trip arm positioned to be operated by the plants and adjustably mounted and having its upper end of cam formation and extended beneath the rocker.

3. In apparatus for supplying insecticide to plants, a container having an outlet, a valve for the outlet, a rocker for actuating the valve having the lower side of its forward portion hollow, means normally holding the valve closed and the rocker in predetermined position, and a trip arm positioned to be actuated by the plants having its upper end of cam formation and engaging the lower hollow side of the rocker.

4. In apparatus for supplying insecticide to plants, a container having an outlet, a valve for the outlet, a rocker for actuating the valve, means normally holding the valve closed and the rocker in predetermined position, and a trip arm positioned to be operated by the plants and having its upper end of cam formation in operative engagement with said rocker, whereby on actuation of said arm the rocker is moved to open the valve.

5. In apparatus for applying insecticide to plants, an insecticide distributing means, arms extending therefrom and provided with means whereby they may be pivotally connected to fixed parts of a frame structure supported for travel, a flexible element connected to the said distributing means, a reservoir for the insecticide, means for conducting the insecticide from the reservoir to the distributing means, means for frictionally engaging the said flexible element at different points in its length whereby to provide for support of the distributing means at different elevations, and a shield extending in advance of the distributing means between the said arms.

6. An insecticide distributor comprising a support, a transverse tank having a plurality of outlets in its bottom and having a vertical extension at its front side formed with vertical slots, valves for the outlets, rockers mounted upon the vertical extension of the tank and connected with the valves, trip arms for the rockers positioned to be operated by the plants, brackets extended from the tank and supporting the trip arms, and connecting means between the brackets and support and having inclined portions forming shields.

In testimony whereof I affix my signature.

ALEXANDER C. PEEL. [L. S.]